(12) United States Patent
Yang et al.

(10) Patent No.: US 12,118,091 B2
(45) Date of Patent: Oct. 15, 2024

(54) METHODS FOR SECURELY UPDATING SOFTWARE

(71) Applicant: Quanta Computer Inc., Taoyuan (TW)

(72) Inventors: Zhi-Xian Yang, Taoyuan (TW); Zhen-An Hung, Taoyuan (TW); Chia-Yu Lin, Taoyuan (TW); Shin-Hong Chen, Taoyuan (TW)

(73) Assignee: QUANTA COMPUTER INC., Taoyuan (TW)

( * ) Notice: Subject to any disclaimer, the term of this patent is extended or adjusted under 35 U.S.C. 154(b) by 366 days.

(21) Appl. No.: 17/670,122

(22) Filed: Feb. 11, 2022

(65) Prior Publication Data

US 2023/0259628 A1   Aug. 17, 2023

(51) Int. Cl.
| | |
|---|---|
| *H04L 29/06* | (2006.01) |
| *G06F 8/65* | (2018.01) |
| *G06F 21/57* | (2013.01) |
| *H04L 9/08* | (2006.01) |
| *H04L 9/14* | (2006.01) |
| *H04L 9/40* | (2022.01) |

(52) U.S. Cl.
CPC .............. *G06F 21/572* (2013.01); *G06F 8/65* (2013.01); *H04L 9/0819* (2013.01); *H04L 9/14* (2013.01); *H04L 63/0428* (2013.01); *G06F 2221/033* (2013.01)

(58) Field of Classification Search
None
See application file for complete search history.

(56) References Cited

U.S. PATENT DOCUMENTS 11,431,488 B1 *   8/2022   Sapuntzakis ............ H04L 9/085
11,922,220 B2 *   3/2024   Haghighat .......... G06F 11/3409
(Continued)

FOREIGN PATENT DOCUMENTS

CN        102547620 A      7/2012
JP       2022-507151 A      1/2023
(Continued)

OTHER PUBLICATIONS

Gupta, Hemant; van Oorschot, Paul C. Onboarding and Software Update Architecture for IoT Devices. 2019 17th International Conference on Privacy, Security and Trust (PST). https://ieeexplore.ieee.org/stamp/stamp.jsp?tp=&arnumber=8949023 (Year: 2019).*
Steger, Marco et al. An Efficient and Secure Automotive Wireless Software Update Framework. IEEE Transactions on Industrial Informatics, vol. 14, Issue: 5. https://ieeexplore.ieee.org/stamp/stamp.jsp?tp=&arnumber=8141933 (Year: 2018).*
(Continued)

*Primary Examiner* — Jeremiah L Avery
(74) *Attorney, Agent, or Firm* — NIXON PEABODY LLP

(57) ABSTRACT

A method for updating software comprises transmitting a first version of the software and a first decryption key to a computing system. The method further comprises generating a second version of the software and a second decryption key. The method further comprises encrypting the second version of the software and the second decryption key. The encrypted second version of the software is configured to be decrypted using the first decryption key and not the second decryption key. The method further comprises transmitting the encrypted second version of the software and the encrypted second decryption key to the computing system.

20 Claims, 5 Drawing Sheets

(56) References Cited

U.S. PATENT DOCUMENTS

| | | | | |
|---|---|---|---|---|
| 2012/0266231 | A1* | 10/2012 | Spiers | G06F 9/45533 |
| | | | | 726/12 |
| 2013/0159726 | A1* | 6/2013 | Mckeen | G06F 21/53 |
| | | | | 713/189 |
| 2016/0212103 | A1* | 7/2016 | Rhoads | H04L 63/0869 |
| 2016/0306966 | A1* | 10/2016 | Srivastava | H04L 9/30 |
| 2019/0109821 | A1* | 4/2019 | Clark | H04L 63/0414 |
| 2019/0340379 | A1* | 11/2019 | Beecham | G06F 16/9014 |
| 2020/0151335 | A1* | 5/2020 | Ayoub | G06F 8/65 |
| 2021/0263779 | A1* | 8/2021 | Haghighat | G06F 9/5061 |
| 2021/0377016 | A1 | 12/2021 | Perlman et al. | |
| 2022/0019698 | A1* | 1/2022 | Durham | H04L 9/0841 |
| 2022/0116376 | A1* | 4/2022 | Stayskal | H04L 63/20 |
| 2022/0207155 | A1* | 6/2022 | Chhabra | G06F 21/6227 |
| 2022/0209969 | A1* | 6/2022 | Chhabra | H04L 9/0866 |
| 2022/0247554 | A1* | 8/2022 | Peddada | H04L 9/0897 |
| 2022/0247584 | A1* | 8/2022 | Johnson | G06F 21/53 |
| 2022/0261487 | A1* | 8/2022 | Lounsberry | G06F 21/6209 |

FOREIGN PATENT DOCUMENTS

| | | |
|---|---|---|
| TW | 202009775 A | 3/2020 |
| TW | 202201217 A | 1/2022 |

OTHER PUBLICATIONS

Jain, Neha et al. Infield firmware update: Challenges and solutions. 2016 International Conference on Communication and Signal Processing (ICCSP). https://ieeexplore.ieee.org/stamp/stamp.jsp?tp=&arnumber=7754349 (Year: 2016).*

TW Office Action for Application No. 111114687, mailed Jul. 4, 2023, w/ First Office Action Summary.

TW Search Report for Application No. 111114687, mailed Jul. 4, 2023, w/ First Office Action.

JP Office Action for Application No. 2022-125545, mailed Sep. 26, 2023, w/ First Office Action Summary, 9 pp.

* cited by examiner

METHODS FOR SECURELY UPDATING SOFTWARE

FIELD OF THE INVENTION

The present invention relates generally to methods for updating software, and more specifically, to a method of securely updating firmware installed on a computing system.

BACKGROUND OF THE INVENTION

Computing systems, such as servers, often require software updates to ensure continued reliability in operation. For example, computing systems generally include a controller (such as a baseboard management controller, or BMC) with firmware (such as a BIOS (basic input/output system) or UEFI (unified extensible firmware interface)) installed that controls basic functions of the computing system. If the firmware needs to be updated, the vendor can host a software package on a publicly available website so that a user of the computer system can download the software package and update the firmware. The software package will generally include an updated version of the firmware, and any other combination of software and/or files necessary to install the updated version of the firmware. However, if this software package is publicly available, malicious users (e.g., hackers) may be able to decompile the firmware and gain access to the source code, which is generally undesirable. However, current techniques for securely providing users access to firmware updates (such as sending emails, providing specialized download links, etc.) can often be cumbersome and time consuming. Thus, new methods are needed for securely updating software on computing systems.

SUMMARY OF THE INVENTION

The term embodiment and like terms, e.g., implementation, configuration, aspect, example, and option, are intended to refer broadly to all of the subject matter of this disclosure and the claims below. Statements containing these terms should be understood not to limit the subject matter described herein or to limit the meaning or scope of the claims below. Embodiments of the present disclosure covered herein are defined by the claims below, not this summary. This summary is a high-level overview of various aspects of the disclosure and introduces some of the concepts that are further described in the Detailed Description section below. This summary is not intended to identify key or essential features of the claimed subject matter. This summary is also not intended to be used in isolation to determine the scope of the claimed subject matter. The subject matter should be understood by reference to appropriate portions of the entire specification of this disclosure, any or all drawings, and each claim.

According to certain aspects of the present disclosure, a method for updating software comprises transmitting a first version of the software and a first decryption key to a computing system. The method further comprises generating a second version of the software and a second decryption key. The method further comprises encrypting the second version of the software and the second decryption key. The encrypted second version of the software is configured to be decrypted using the first decryption key and not the second decryption key. The method further comprises transmitting the encrypted second version of the software and the encrypted second decryption key to the computing system.

In some implementations, the method further comprises generating a third version of the software and a third decryption key. The method further comprises encrypting the third version of the software and the third decryption key. The third version of the software is configured to be decrypted using the second decryption key and not the first decryption key or the third decryption key. The method further comprises transmitting the encrypted third version of the software and the encrypted third decryption key to the computing system.

In some implementations, an encrypted version of the first decryption key and the encrypted second decryption key are transmitted to the computing system with the encrypted third version of the software and the encrypted third decryption key.

In some implementations, the method further comprises, subsequent to transmitting the encrypted third version of the software, re-transmitting the encrypted second version of the software to the computing system. The encrypted second version of the software is configured to be decrypted using the previously-transmitted first decryption key.

In some implementations, the first version of the software is an initial version of the software installed on the computing system.

In some implementations, the first decryption key is not encrypted when transmitted to the computing system.

In some implementations, the first version of the software and the first decryption key are encrypted when transmitted to the computing system.

In some implementations, the encrypted first version of the software is configured to be decrypted using a prior decryption key and not the first decryption key. The prior decryption key is transmitted to the computing system prior to the transmission of the encrypted first version of the software and the encrypted first decryption key.

In some implementations, generating the second version of the software and the second decryption key includes generating a software package containing the second version of the software and the second decryption key.

In some implementations, encrypting the second version of the software and the second decryption key includes encrypting the software package. The encrypted software package is configured to be decrypted using the first decryption key and not the second decryption key.

In some implementations, transmitting the encrypted second version of the software and the encrypted second decryption key to the computing system includes transmitting the encrypted software package.

In some implementations, generating the software package containing the second version of the software and the second decryption key includes generating source code for the second version of the software. Generating the software package further includes packaging the second decryption key into the source code for the second version of the software to form modified source code. Generating the software package further includes compiling the modified source code to form a software package containing the second version of the software and the second decryption key.

In some implementations, the software is firmware for an electronic device or an electronic system.

In some implementations, the firmware is a basic input/output system (BIOS) of a computing system or a unified extensible firmware interface (UEFI) of the computing system.

In some implementations, the second version of the software and the second decryption key are encrypted using a hash table.

In some implementations, second version of the software is configured to be installed on the computing system to replace the first version of the software.

In some implementations, the software is firmware for a computing system. The second version of the software is configured to be decrypted by and installed on the computing system when the computing system is in a system management mode.

In some implementations, the first version of the software is configured to trigger a system management interrupt on the computing system when the encrypted second version of the software is transmitted to the computing system.

In some implementations, the system management interrupt is configured to cause the computing system to enter the system management mode and decrypt the second version of the software using the first decryption key.

In some implementations, the encrypted second version of the software is hosted at a publicly available network location.

According to certain aspects of the present disclosure, a method for updating software comprises receiving a first version of the software and a decryption key. The method further comprises installing the first version of the software on a computing system. The method further comprise receiving an encrypted software package that includes a second version of the software. The method further comprises decrypting the encrypted software package with the previously-received decryption key. The method further comprises installing the second version of the software on the computing system to replace the first version of the software.

The above summary is not intended to represent each embodiment or every aspect of the present disclosure. Rather, the foregoing summary merely provides an example of some of the novel aspects and features set forth herein. The above features and advantages, and other features and advantages of the present disclosure, will be readily apparent from the following detailed description of representative embodiments and modes for carrying out the present invention, when taken in connection with the accompanying drawings and the appended claims. Additional aspects of the disclosure will be apparent to those of ordinary skill in the art in view of the detailed description of various embodiments, which is made with reference to the drawings, a brief description of which is provided below.

BRIEF DESCRIPTION OF THE DRAWINGS

The disclosure, and its advantages and drawings, will be better understood from the following description of representative embodiments together with reference to the accompanying drawings. These drawings depict only representative embodiments, and are therefore not to be considered as limitations on the scope of the various embodiments or claims.

DETAILED DESCRIPTION

Figure 1:
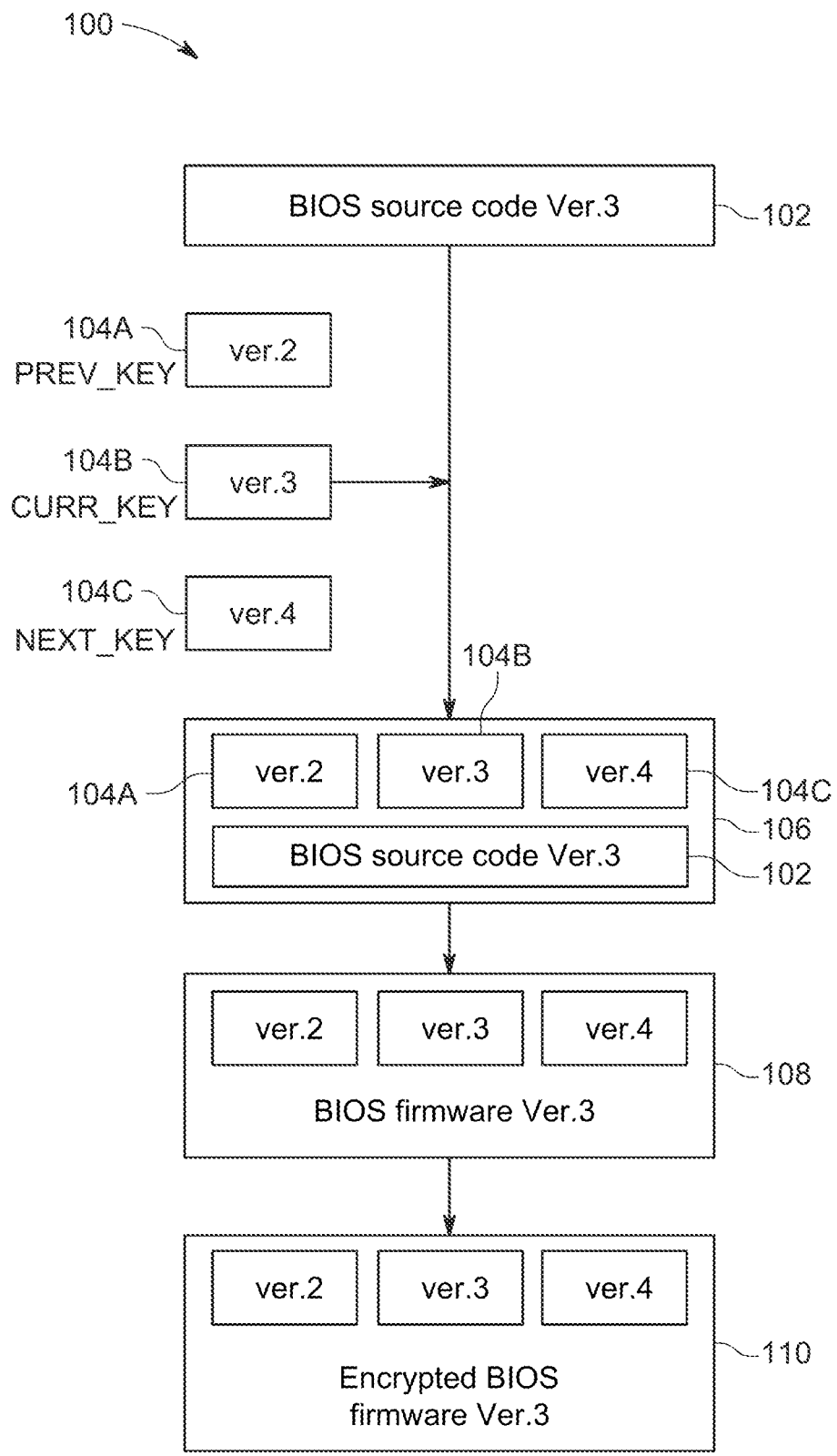
FIG. 1 is a flowchart of a process for providing an encrypted software package, according to certain aspects of the present disclosure.

Computing systems (such as servers) utilize firmware to control basic operations. Computing systems can have different types of firmware, including BIOS (basic input/output system), UEFI (unified extensible firmware interface, sometimes referred to as UEFI BIOS), and other types of firmware. Disclosed herein are methods for securely updating the firmware that is installed on a computing system, without allowing unintended users to inadvertently access an unencrypted version of the firmware. The methods generally include encrypting a software package that contains the updated version of the firmware (and any other software and/or files necessary to update the firmware) and sending the encrypted package to the intended user (e.g., to the computing device of the intended user). The user will already possess a decryption key that can be used to decrypt the encrypted software package. Generally, the decryption key will have been previously sent as part of a previous software package. This previous software package will have contained the version of the firmware that is currently installed on the computing system. Thus, the decryption key that was previously sent to the user can be used to decrypt the later software package.

Various embodiments are described with reference to the attached figures, where like reference numerals are used throughout the figures to designate similar or equivalent elements. The figures are not necessarily drawn to scale and are provided merely to illustrate aspects and features of the present disclosure. Numerous specific details, relationships, and methods are set forth to provide a full understanding of certain aspects and features of the present disclosure, although one having ordinary skill in the relevant art will recognize that these aspects and features can be practiced without one or more of the specific details, with other relationships, or with other methods. In some instances, well-known structures or operations are not shown in detail for illustrative purposes. The various embodiments disclosed herein are not necessarily limited by the illustrated ordering of acts or events, as some acts may occur in different orders and/or concurrently with other acts or events. Furthermore, not all illustrated acts or events are necessarily required to implement certain aspects and features of the present disclosure.

For purposes of the present detailed description, unless specifically disclaimed, and where appropriate, the singular includes the plural and vice versa. The word "including" means "including without limitation." Moreover, words of approximation, such as "about," "almost," "substantially," "approximately," and the like, can be used herein to mean "at," "near," "nearly at," "within 3-5% of," "within acceptable manufacturing tolerances of," or any logical combination thereof. Similarly, terms "vertical" or "horizontal" are intended to additionally include "within 3-5% of" a vertical or horizontal orientation, respectively. Additionally, words of direction, such as "top," "bottom," "left," "right," "above," and "below" are intended to relate to the equivalent direction as depicted in a reference illustration; as understood contextually from the object(s) or element(s) being referenced, such as from a commonly used position for the object(s) or element(s); or as otherwise described herein.

FIG. 1 illustrates a flowchart 100 of a process for providing a secure software package that can be downloaded by users. The present disclosure generally describes and illustrates the process of updating the BIOS of a computing system. However, those of skill in the art will understand that the principles disclosed herein can also be used to update other types of firmware (such as a UEFI) that may be used with the computing system, and other types of software besides firmware. In the example illustrated by flowchart 100, a second version of the BIOS is installed on the computing system, and the third version of the BIOS is being prepared for the user to securely download. The process begins by generating source code 102 for the third version of the BIOS, denoted as "BIOS source code Ver.3". The source code 102 can generally be in any suitable human-readable programming language, such as C, C++, Java, Python, etc.

Next, decryption keys associated with different versions of the BIOS are generated. In the illustrated example, the decryption keys include a second version decryption key 104A (also denoted as PREV_KEY), a third version decryption key 104B (also denoted as CURR_KEY), and a fourth version decryption key 104C (also denoted as NEXT_KEY). The decryption keys 104A-104C can be utilized by the user of the computing system to decrypt software packages that include updated versions of the BIOS. As is discussed in more detail herein, a new decryption key is generated for every new version of the BIOS. Generally, when a decryption key is generated, it is checked against past decryption keys to ensure that it is not too similar. In some implementations, once the decryption keys 104A-104C are transmitted to the computing system, the decryption keys 104A-104C are stored on the computing system and are used automatically by the computing system to decrypt a software package received by the computing system.

The second version decryption key 104A can be used to decrypt a software package that contains the previous version of the BIOS relative to the version of the BIOS that the source code 102 is for (e.g., the second version of the BIOS in the example of FIG. 1). The third version decryption key 104B can be used to decrypt a software package that contains the version of the BIOS that the source code 102 is for (e.g., the third version of the BIOS in the example of FIG. 1). The fourth version decryption key 104C can be used to decrypt a software package that contains a future version of the BIOS relative to the version of the BIOS that the source code 102 is for (e.g., a future fourth version of the BIOS in the example of FIG. 1).

Next, the decryption keys 104A-104C can be packaged into the source code 102 to form modified source code 106. As shown in FIG. 1, the decryption keys 104A-104C (e.g., the decryption keys for the previous version of the BIOS, the current version of the BIOS, and the next version of the BIOS) are packaged into the source code 102 for the third version of the BIOS (e.g., the version of the BIOS to which the computing system will be updated). The result is modified source code 106 that includes the source code 102 for the next version of the BIOS, and the decryption keys 104A-104C that can be used to decrypt various software packages containing different versions of the BIOS. Generally, the decryption keys 104A-104C are packaged into the source code 102 such that the decryption keys 104A-104C are built into the next version of the BIOS itself. As discussed in further detail herein, when a version of the BIOS that has a decryption key built therein is installed on the computing system, that version of the BIOS (when installed) can manage the decryption key, and automatically use the decryption key to decrypt an encrypted software package that includes a subsequent version of the BIOS.

The modified source code 106 is then compiled to form a software package 108. The modified source code 106 can be compiled using any suitable compiler that can be used to compile source code of the programming language that the modified source code 106 (and the source code 102) is written in. As noted, the decryption keys 104A-104C are packaged into the source code 102 such that when the modified source code 106 is compiled, the software package 108 forms an updated version of the BIOS that contains the decryption keys 104A-104C and can be installed on a computing system.

Finally, the software package 108 is encrypted to form an encrypted software package 110. The encrypted software package 110 includes the compiled version of the modified source code 106, which includes both the source code 102 for the updated version of the BIOS, and the decryption keys 104A-104C. The software package 108 can be encrypted using any suitable encryption technique that allows corresponding decryption keys to be packaged into source code, compiled, and encrypted. Other encryption techniques can also be used. Once the software package 108 is encrypted to form the encrypted software package 110, the encrypted software package 110 can be transmitted to a user (e.g., to a destination computing system where it can be used to install the updated version of the BIOS).

In some implementations, the software package 108 is encrypted using a hash table to form the encrypted software package 110. A hash table is a table of 8-bit numbers (e.g., 1-byte numbers) that can be used to replace each group of 8 bits (e.g., each byte) of the software package 108, to thereby form the encrypted software package 110. The hash table will generally include 256 different positions that are numbered 0-255. Each position will contain a unique two-digit hexadecimal number that ranges from 00 to FF. A single digit hexadecimal number (which ranges from 0-F, where A-F follows 0-9) is equivalent to a 4-bit binary number, and thus the two-digit hexadecimal numbers in each position of the table represent an 8-bit binary number. A hexadecimal value of 00 represents 00000000 in binary, and 0 in decimal (e.g., base 10). A hexadecimal value of FF represents 11111111 in binary, and 255 in decimal. Because two hexadecimal values range from 0 to 255 in decimal, hexadecimal numbers and/or binary numbers can also be used to represent the positions in the hash table itself. Thus, position 0 in the hash table can also be represented as position 00 (hexadecimal) and position 00000000 (binary). Similarly, position 255 in the hash table can also be represented as position FF (hexadecimal) and position 11111111 (binary). Generally, any hash table that is used for decryption according to the present disclosure will have a unique two-digit hexadecimal number in each position. And because there are 256 possible two-digit hexadecimal numbers and 256 positions in the hash table, every possible two-digit hexadecimal number will be located in one of the positions of the hash table.

To encrypt the software package 108, each group of 8 bits of the software package 108 is first located in the hash table. Then, the 8 bits of the software package 108 are replaced by the 8 bits that represent the position within the hash table where those 8 bits of the software package 108 were located. Because every possible two-digit hexadecimal number is located within an entry of the hash table, it is not possible for a group of 8 bits in the software package 108 to not be located and replaced. For example, a group of 8 bits in the software package 108 may 10001011 in binary, which is equivalent to 8B in hexadecimal. In an example hash table, the value 8B is located at position 238. 238 in decimal is equivalent to EE in hexadecimal, and 11101110 in binary. Thus, the 8-bit number of 10001011 in the software package 108 is replaced with the 8-bit number 11101110 in the modified software package 110.

To decrypt the encrypted software package 110, the hash table can be used in reverse. A group of 8 bits is located in the encrypted software package 110, and replaced by the 8-bit value (e.g., two-digit hexadecimal number) that is located within an entry of the hash table that corresponds to the 8-bit value in the encrypted software package. Thus, if a group of 8 bits in the encrypted software package 110 is 11011010 (equivalent to DA in hexadecimal and 218 in decimal), those 8 bits will be replaced by the 8 bits (e.g., the 2-digit hexadecimal number) that are located at entry 218 of the hash table. The decryption key for a given encrypted software package will thus generally contain at least the hash table that was used to encrypt the software package and form the encrypted software package. Because the hash table has 256 separate positions, there are 256! (256 factorial) different 256-position hash tables that can be generated. As such, it will be virtually impossible for a malicious third party to decrypt the encrypted software package if they do not already possess the required decryption key.

The decryption keys (such as decryption keys 104A-104C) are packaged into the source code 102 to form modified source code 106, such that when the modified source code 106 is compiled into the software package 108, the software package 108 can itself be installed as the next version of the BIOS, and the decryption keys are built into the BIOS itself. Thus, the BIOS can automatically use the decryption keys as needed to decrypt an encrypted software package. In implementations where the software package 108 is encrypted using a hash table, the modified source code 106 will generally include the hash table included within the source code (e.g., the source code will declare tables directly within a header file of the source code).

While FIG. 1 shows the encrypted software package 110 as including three different decryption keys 104A-104C, in other implementations, the encrypted software package 110 may include only the fourth version decryption key 104C. Thus, in these implementations, the source code for the third version of the BIOS can be packaged only with the fourth version decryption key 104C. The fourth version decryption key 104C can be used by the computing system in the future to decrypt a future encrypted software package that contains the fourth version of the BIOS. In still other implementations, the encrypted software package 110 can contain any number of decryption keys, so long as the encrypted software package 110 contains the fourth version decryption key 104C.

Figure 2:
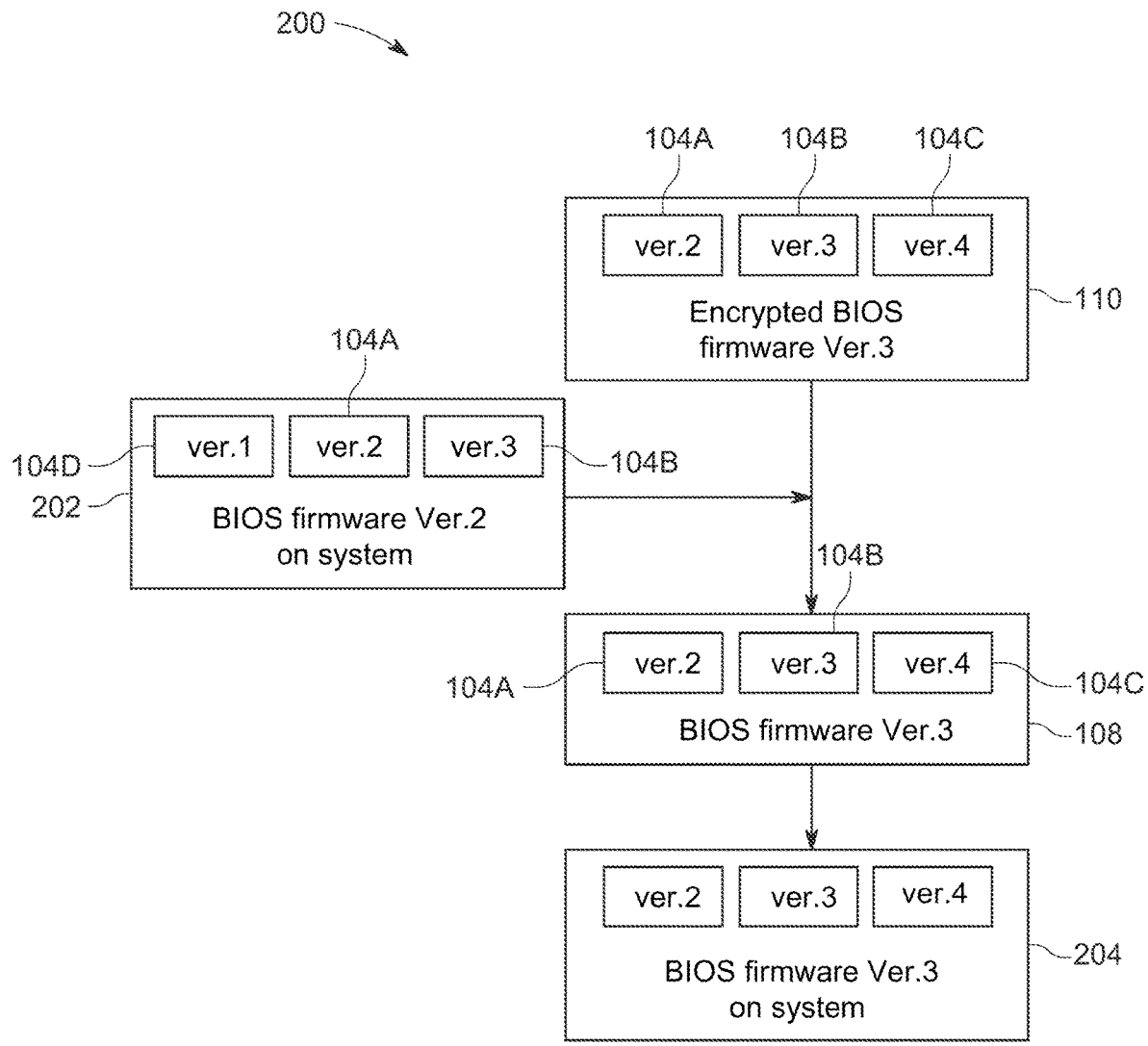
FIG. 2 is a flowchart of a process for updating software on a destination device using the encrypted software package of FIG. 1, according to certain aspects of the present disclosure.

FIG. 2 illustrates a flowchart 200 of a process for updating the version of the BIOS that is installed on a computing system using the encrypted software package 110. In the example illustrated by flowchart 200, the computing system has received the encrypted software package 110 (which includes the third version of the BIOS), and has the second version of the BIOS currently installed. The encrypted software package 110 also includes the second version decryption key 104A for an encrypted software package containing the second version of the BIOS, the third version decryption key 104B for an encrypted software package containing the third version of the BIOS (e.g., the encrypted software package 110), and the fourth version decryption key 104C for an encrypted software package containing a future fourth version of the BIOS. As noted herein, the decryption keys 104A-104C are built into the third version of the BIOS itself.

The second version of the BIOS that is currently installed on the computing system was previously transmitted to the computing system as part of a software package 202. The software package 202 includes the second version of the BIOS, as well as three decryption keys built into the second version of the BIOS. As is discussed in more detail herein, the software package 202 was previously transmitted to the computing system in one of two different manners. First, the software package 202 could have been transmitted to the computing system in an unencrypted form. Second, the software package 202 could have been transmitted to the computing system in an encrypted form, and the computing system already possessed the decryption key required to decrypt the software package 202 (for example built into the BIOS installed on the computing system when the software package 202 was received).

The three decryption keys previously sent with the software package 202 include a first version decryption key 104D used to decrypt an encrypted software package containing the first version of the BIOS, the second version decryption key 104A (that can be used to decrypt an encrypted software package containing the second version of the BIOS), and the third version decryption key 104B (that can be used to decrypt the encrypted software package 110 that contains the third version of the BIOS).

Because the third version decryption key 104B that comes with the third version of the BIOS is encrypted within the encrypted software package 110, the third version decryption key 104B cannot be used to decrypt the encrypted software package 110. However, the software package 202 that was previously transmitted to the computing system also includes the third version decryption key 104B. The third version decryption key 104B is thus already built into the second version of the BIOS that is currently installed on the computing system. Thus, the computing system can decrypt the encrypted software package 110 using the previously-received third version decryption key 104B (e.g., the decryption key that is built into the version of the BIOS that was installed on the computing system when the encrypted software package 110 was received). As shown in FIG. 2, decrypting the encrypted software package 110 provides the computing system with the software package 108, which contains the third version of the BIOS and the decryption keys 104A-104C. The third version of the BIOS can then be installed on the computing system, shown in box 204. Further, because the computing system now possesses the fourth version decryption key 104C, the computing system will be able to decrypt a future encrypted software package that contains a fourth version of the BIOS. Similar to FIG. 1, while FIG. 2 shows the encrypted software package 110 as including three different decryption keys 104A-104C, in other implementations, the encrypted software package 110 may include any number of decryption keys, so long as the encrypted software package 110 contains the fourth version decryption key 104C.

Thus, as shown in FIGS. 1 and 2, the decryption key that can be used to decrypt a particular encrypted software package will be previously transmitted to the computing system before the encrypted software package is transmitted. Then, when the computing system later receives an encrypted software package that contains the updated version of the BIOS, the computing system will already possess the decryption key that is required to decrypt the encrypted software package. The encrypted software packages thus form a chain of encrypted software packages that contain decryption keys and BIOS versions. Each encrypted software package that is transmitted to the computing system contains the decryption key for next encrypted software package that will be transmitted to the computing system, so that the computing system will be able to decrypt that next encrypted software package when it is received. And the computing system will already possess the required decryption key when it receives an encrypted software package.

Generally, this chain of encrypted software packages will begin with an initial decryption key that is unencrypted (e.g., is not itself encrypted within some other software package). The computing system will be given access to this unencrypted initial decryption key, so that the computing system will be able to decrypt the first encrypted software package in the chain (which will contain the next version of the BIOS, and the decryption key for the second encrypted software package).

In some implementations, the computing system is built to include the initial version of the BIOS, and the unencrypted initial decryption key (that will be used to decrypt an encrypted software package that contains the next version of the BIOS) is built into this initial version of the BIOS. Thus, when a user initially obtains and begins to use the computing system, the computing system will contain the unencrypted initial decryption key that will be used to decrypt the first encrypted software package in the chain. This software package will contain the next version of the BIOS (e.g., the first update to the BIOS), and the decryption key that will be required for the next encrypted software package in the chain will be built into this next version of the BIOS.

In other implementations, the vendor may provide the unencrypted initial decryption key in a manner that ensures only the desired recipient (e.g., a verified user of a computing system) receives the unencrypted initial decryption key. These implementations could include sending each verified recipient a specialized download link, directly transmitting the unencrypted initial decryption key to a verified recipient via email, and other techniques. In these implementations, the user of the computing system can take steps to install or otherwise include the decryption key into the version of the BIOS currently installed in the computing system.

In any of these implementations, it is difficult for a third party (e.g., an unintended recipient such as a hacker) to gain access to the unencrypted initial decryption keys. And because all of the subsequent decryption keys will themselves be encrypted within other software packages, the third party will not be able to gain access to the source code of the BIOS within the software package, even though the encrypted software package containing the BIOS will be publicly available.

Figure 3:
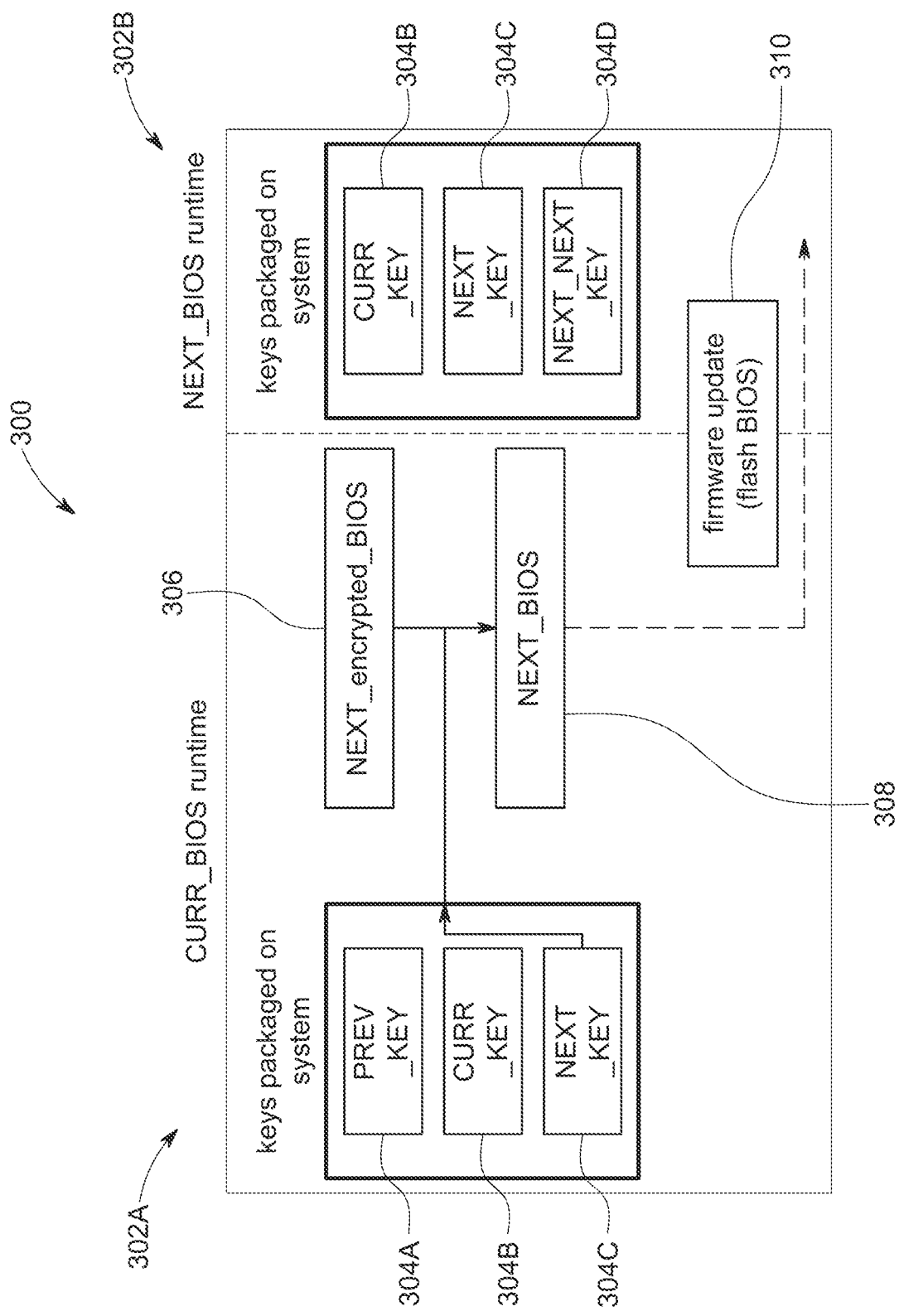
FIG. 3 is an illustration of two runtime cycles of computing system installing an updated version of software using the encrypted software package of FIG. 1, according to certain aspects of the present disclosure.

FIG. 3 illustrates two runtime cycles of a computing system using the decryption keys to update the BIOS that is currently installed on the computing system. The flow chart 300 includes a runtime cycle 302A of the current version of the BIOS, and a runtime cycle 302B of the next version of the BIOS. The runtime cycle 302A is denoted as CURR_BIOS runtime, and the runtime cycle 302B is denoted as NEXT_BIOS runtime. As shown in runtime cycle 302A, the computing system already possesses a previous version decryption key 304A (denoted as PREV_KEY), a current version decryption key 304B (denoted as CURB_KEY), and a first next version decryption key 304C (denoted as NEXT_KEY). These decryption keys were previously received by the computing system, and are built into the current version of the BIOS in an unencrypted form. Referring to the example of FIGS. 1 and 2, the decryption keys 304A-304C correspond to decryption keys 104A-104C, respectively.

In runtime cycle 302A, the computing system has received an encrypted software package 306 (denoted as NEXT_encrypted_BIOS) that contains the next version of the BIOS that will be installed on the computing system. The current version of the BIOS can use the next version decryption key 304C to decrypt the encrypted software package 306. The next version decryption key 304C was previously received by the computing device and is currently built into the current version of the BIOS in an unencrypted form on the computing device. The current version of the BIOS thus uses the next version decryption key 304C to decrypt the encrypted software package 306 and form an unencrypted software package 308. The unencrypted software package 308 (denoted as NEXT_BIOS) contains the next version of the BIOS, and multiple decryption keys.

In runtime cycle 302B, the computing system has installed the next version of the BIOS (sometimes referred to as flashing the BIOS) to replace the current version of the BIOS, as indicated by box 310 that spans runtime cycles 302A and 302B. As is shown, the three decryption keys contained in the unencrypted software package 308 include the current version decryption key 304B, the first next version decryption key 304C, and a second next version decryption key 304D (denoted as NEXT_NEXT_KEY). The second next version decryption key 304D can be used to decrypt a future encrypted software package that includes a subsequent version of the BIOS (e.g., the NEXT_NEXT_BIOS).

In some implementations, the next version of the BIOS is decrypted and installed when the computing system is in a system management mode. When the encrypted software package 306 is transmitted to the computing system and stored in a memory of the computing system, a system management interrupt is triggered by the current version of the BIOS that is installed on the computing system. The system management interrupt causes the computing system to enter system management mode. In system management mode, the computing system decrypts the encrypted software package 306 using the next decryption key 304C, and installs the next version of the BIOS. Moreover, the computing system can also use the other decryption keys contained within a given software package to flash back to previous versions of the BIOS.

Figure 4:
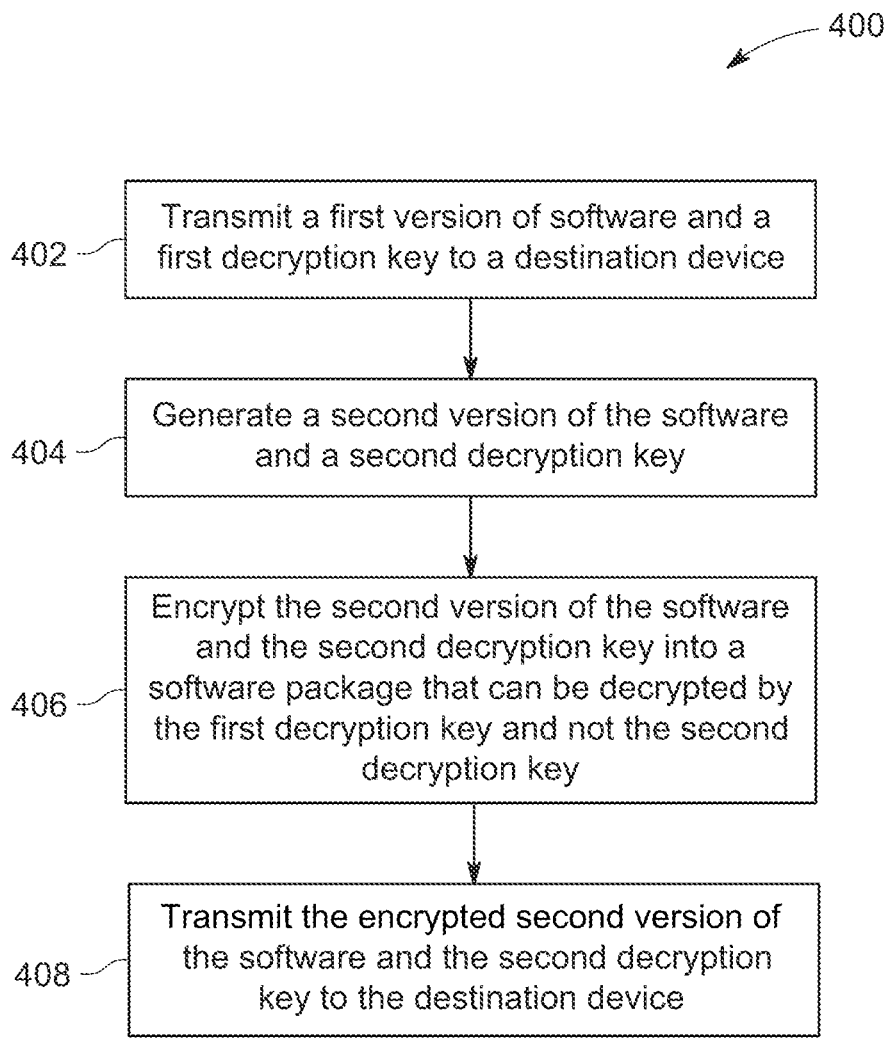
FIG. 4 is a flowchart of a method for generating an encrypted software package, according to certain aspects of the present disclosure.

FIG. 4 shows a flowchart of a method 400 for generating an encrypted software package. The method of 400 utilizes the principles discussed herein with respect to FIGS. 1-3. In some implementations, the software is firmware for an electronic device or system. For example, as disclosed herein, the software can be the BIOS or the UEFI of a computing system. However, method 400 can be used to update other types of software as well. At step 402 of method 400, a first version of the software and a first decryption key are transmitted to a destination device. In some cases, the destination device is a computing system, and the software is firmware (such as the BIOS or the UEFI) for the computing system. The first decryption key is configured to decrypt a future software package containing a second version of the software that will be sent to the destination device.

In some implementations, the first version of the software and/or the first decryption key are not encrypted when transmitted to the destination device. In some of these implementations, the first version of the software is the initial version of the software installed on the destination device (e.g., the first version of the BIOS or UEFI installed on a computing device), and transmitting the first version of the software could include the initial installation process of the software on the destination device. The first decryption key will generally be the first decryption key that the destination device will use to decrypt a future version of the software (e.g., a future version of the BIOS or UEFI). In other implementations, the first version of the software and the first decryption key are encrypted. In these implementations, the first version of the software and the first decryption key are generally part of a chain of versions of the software and the decryption key. The destination device will generally already possess a prior decryption key that is used to decrypt the first version of the software and the first decryption key.

At step 404 of method 400, a second version of the software and a second version of the decryption key are generated using any suitable techniques. In some implementations, generating the second version of the software and the second decryption key includes generating source code for the second version of the software, packaging the second decryption key into the source code to form modified source code, and compiling the modified source code into a software package that contains the second version of the software and the second decryption key.

At step 406 of method 400, the second version of the software and the second decryption key are encrypted into an encrypted software package. This software package is configured to be decrypted by the first decryption key (which was previously transmitted to the destination device), and not the second decryption key. In other implementations, the second version of the software and the second decryption key can be encrypted individually, or can be encrypted together in such a manner that a software package is not created (e.g., a folder or a ZIP file containing the second version of the software and the second decryption key can be encrypted). In either case, the encryption is done such that the first decryption key and not the second decryption key can be used to decrypt the second version of the software and the second decryption key.

At step 408 of method 400, the encrypted second version of the software and the encrypted second decryption key are transmitted to the destination device. In some cases, the encrypted second version of the software and the encrypted second decryption key are hosted at a publicly available network location. The destination device can use the previously-transmitted first decryption key to decrypt the second version of the software and the second decryption key. The second version of the software can then be installed on the destination device to replace the first version of the software. In implementations where the second version of the software and the second decryption key are packaged into a software package, step 408 includes transmitting the encrypted software package to the destination device. The encrypted software package can be decrypted by the destination device using the previously-transmitted first decryption key.

In some implementations, the steps of method 400 form part of a chain of versions of the software and decryption keys. Thus, in these implementations, method 400 can further include generating a third version of the software and a third decryption key. Then, the third version of the software and the third decryption key can be encrypted so that they can be decrypted by the previously-transmitted second decryption key, but not the first decryption key or the third decryption key. The encrypted third version of the software and the encrypted third decryption key (which may be packaged into an encrypted software package) can be transmitted to the destination device. Because the destination device previously received the second decryption key (with the second version of the software) and used the first decryption key to decrypt the second decryption key, the destination device can now use the second decryption key to decrypt the third version of the software and the third decryption key.

Figure 5:
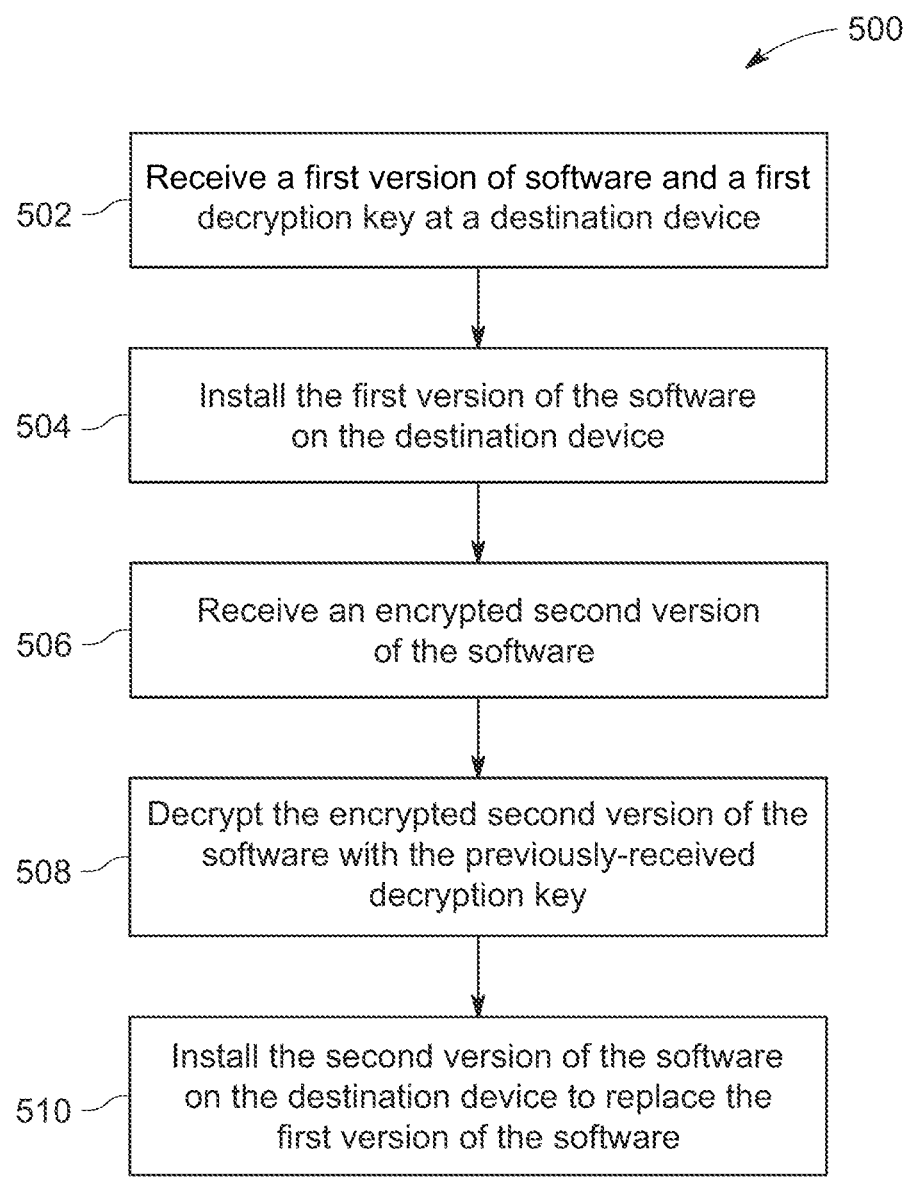
FIG. 5 is a flowchart of a method for updating software using an encrypted software package, according to certain aspects of the present disclosure.

FIG. 5 shows a flowchart of a method 500 for updating software using an encrypted software package, from the perspective of a destination device. Generally, method 500 is a counterpart to method 400. Thus, the software can be the firmware of an electronic device or system, such as the BIOS or UEFI of a computing system. At step 502 of method 500, the destination device receives a first version of the software and a decryption key. The first version of the software and/or the first decryption key could be initially installed on the destination device, or may be received at a later time. The first version of the software and/or the first decryption key could be received by the destination device in an unencrypted form or an encrypted form (in which case the destination device will generally possess a decryption key required to decrypt them).

At step 504 of method 500, the first version of the software is installed on the destination device. If the first version of the software was encrypted, the first version of the software is decrypted and then installed. At step 506 of method 500, the destination device receives an encrypted second version of the software. In some implementations, the second version of the software is formed as part of a software package that is encrypted. This software package could include an additional decryption key. At step 508 of method 500, the destination device decrypts the encrypted second version of the software using the decryption key that was previously received at step 502. In implementations where the second version of the software is in an encrypted software package, step 508 includes decrypting the encrypted second package using the previously-received decryption key. At step 510 of method 500, the second version of the software is installed on the destination device to replace the first version of the software.

Although the disclosed embodiments have been illustrated and described with respect to one or more implementations, equivalent alterations and modifications will occur or be known to others skilled in the art upon the reading and understanding of this specification and the annexed drawings. In addition, while a particular feature of the invention may have been disclosed with respect to only one of several implementations, such feature may be combined with one or more other features of the other implementations as may be desired and advantageous for any given or particular application.

While various embodiments of the present disclosure have been described above, it should be understood that they have been presented by way of example only, and not limitation. Numerous changes to the disclosed embodiments can be made in accordance with the disclosure herein, without departing from the spirit or scope of the disclosure. Thus, the breadth and scope of the present disclosure should not be limited by any of the above described embodiments. Rather, the scope of the disclosure should be defined in accordance with the following claims and their equivalents.

What is claimed is:

1. A method of updating software, the method comprising:
   transmitting a first version of the software and a first decryption key to a computing system;

generating a second version of the software and a second decryption key;
encrypting the second version of the software and the second decryption key, the encrypted second version of the software being configured to be decrypted using the first decryption key and not the second decryption key; and
transmitting the encrypted second version of the software and the encrypted second decryption key to the computing system.

2. The method of claim 1, further comprising:
generating a third version of the software and a third decryption key;
encrypting the third version of the software and the third decryption key, the third version of the software being configured to be decrypted using the second decryption key and not the first decryption key or the third decryption key; and
transmitting the encrypted third version of the software and the encrypted third decryption key to the computing system.

3. The method of claim 2, wherein an encrypted version of the first decryption key and the encrypted second decryption key are transmitted to the computing system with the encrypted third version of the software and the encrypted third decryption key.

4. The method of claim 1, wherein the first version of the software is an initial version of the software installed on the computing system.

5. The method of claim 1, wherein the first decryption key is not encrypted when transmitted to the computing system.

6. The method of claim 1, wherein the first version of the software and the first decryption key are encrypted when transmitted to the computing system.

7. The method of claim 6, wherein the encrypted first version of the software is configured to be decrypted using a different decryption key that is prior to and not the first decryption key, the different decryption key being transmitted to the computing system prior to the transmission of the encrypted first version of the software and the encrypted first decryption key.

8. The method of claim 1, wherein generating the second version of the software and the second decryption key includes generating a software package containing the second version of the software and the second decryption key.

9. The method of claim 8, wherein encrypting the second version of the software and the second decryption key includes encrypting the software package, the encrypted software package being configured to be decrypted using the first decryption key and not the second decryption key.

10. The method of claim 9, wherein transmitting the encrypted second version of the software and the encrypted second decryption key to the computing system includes transmitting the encrypted software package.

11. The method of claim 8, wherein generating the software package containing the second version of the software and the second decryption key includes:
generating source code for the second version of the software;
packaging the second decryption key into the source code for the second version of the software to form modified source code; and
compiling the modified source code to form a software package containing the second version of the software and the second decryption key.

12. The method of claim 1, wherein the software is firmware for an electronic device or an electronic system.

13. The method of claim 12, wherein the firmware is a basic input/output system (BIOS) of a computing system or a unified extensible firmware interface (UEFI) of the computing system.

14. The method of claim 1, wherein the second version of the software and the second decryption key are encrypted using a hash table.

15. The method of claim 1, wherein the second version of the software is configured to be installed on the computing system to replace the first version of the software.

16. The method of claim 1, wherein the software is firmware for a computing system, and wherein the second version of the software is configured to be decrypted by and installed on the computing system when the computing system is in a system management mode.

17. The method of claim 16, wherein the second version of the software is configured to trigger a system management interrupt on the computing system when the encrypted second version of the software is transmitted to the computing system.

18. The method of claim 17, wherein the system management interrupt is configured to cause the computing system to enter the system management mode and decrypt the second version of the software using the first decryption key.

19. The method of claim 1, wherein the encrypted second version of the software is hosted at a publicly available network location.

20. A method of updating software, the method comprising:
initially receiving a first version of the software and a first decryption key;
installing the first version of the software on a computing system;
subsequently receiving an encrypted software package that includes a second version of the software and a second decryption key;
decrypting the encrypted software package with the first decryption key and not the second decryption key; and
installing the second version of the software on the computing system to replace the first version of the software.

* * * * *